(12) United States Patent
Fabio

(10) Patent No.: US 6,789,001 B1
(45) Date of Patent: Sep. 7, 2004

(54) DIGITAL MULTIFUNCTION RELAY

(75) Inventor: Gatelli Fabio, Bagnolo-Mella (IT)

(73) Assignee: ABB T&D Technology Ltd., Zurich (CH)

(*) Notice: Subject to any disclaimer, the term of this patent is extended or adjusted under 35 U.S.C. 154(b) by 0 days.

(21) Appl. No.: 10/149,897

(22) PCT Filed: Oct. 25, 2000

(86) PCT No.: PCT/EP00/10718
§ 371 (c)(1),
(2), (4) Date: Aug. 29, 2002

(87) PCT Pub. No.: WO01/45225
PCT Pub. Date: Jun. 21, 2001

(30) Foreign Application Priority Data

Dec. 16, 1999 (EP) .......................................... 99204336

(51) Int. Cl.⁷ .............................................. G05D 17/00
(52) U.S. Cl. .................. 700/292; 700/291; 700/306; 361/93.2
(58) Field of Search ................................ 700/292, 291, 700/296, 306; 709/223; 712/35; 361/93.2

(56) References Cited

U.S. PATENT DOCUMENTS

| | | | |
|---|---|---|---|
| 5,224,011 A | | 6/1993 | Yalla et al. |
| 5,870,614 A | | 2/1999 | Ang |
| 6,191,546 B1 | * | 2/2001 | Bausch et al. .............. 318/471 |
| 6,370,572 B1 | * | 4/2002 | Lindskog et al. ........... 709/223 |
| 6,506,997 B2 | * | 1/2003 | Matsuyama ................. 219/110 |
| 6,584,542 B1 | * | 6/2003 | Weigand ..................... 711/104 |

FOREIGN PATENT DOCUMENTS

| | | |
|---|---|---|
| EP | 0592783 A2 | 4/1994 |
| EP | 0651314 A1 | 5/1995 |

* cited by examiner

Primary Examiner—Albert W. Paladini
(74) Attorney, Agent, or Firm—Connolly Bove Lodge & Hutz LLP; Larry J. Hume

(57) ABSTRACT

A digital multifunction relay, for controlling one or more protection devices of an power distribution network from fault events, which comprises a digital signal processor for executing a set of processing activities for regulating the operating state of said protection devices. The digital signal processor comprises a first computerized means for calculating the run-time computational load related to said digital signal processor and a second computerized means for reducing said run-time computational load, if said run-time computational load exceeds a predefined threshold.

28 Claims, 2 Drawing Sheets

DIGITAL MULTIFUNCTION RELAY

The present invention relates to a digital multifunction relay having improved characteristics. Digital multifunction relays are well known in the state of the art. They are generally used, in a power distribution network, for controlling the operation of protection devices that have the aim of protecting the power distribution network from fault events for example tripping devices or disconnectors or the like, particularly in the voltage range from 1 KV to 35 KV). Digital multifunction relays can control the operating state of these protection devices and can host many different protection functions, that can be software objects consisting generally of a processing stage and of a state machine stage. Digital multifunction relays generally comprise a digital signal processor DSP which is generally connected to an analog digital AD converter. The A/D converter receives signals from sensors positioned on the power distribution network. These sensors measure some predefined power distribution quantities for example current and/or voltage. The DSP receives, from the A/D converter, sampled values of these predefined quantities and processes the sampled values, in order to obtain some calculated values. The calculated values are used for detecting the presence of a fault event. Based on the calculated values, the DSP generates signals for regulating, the operating state of the protection devices, by means of the mentioned protection functions. For example, the DSP can perform mathematical calculations, such as FFT Fast Fourier Transform algorithms, or determine other quantities such as the transmitted electric power or the equivalent resistance of a branch of the power distribution network. All these described processing activities, performed by the DSP, are commonly defined as "foreground processing activity". It is known that all the foreground processing activity must be executed in a period of time, which elapses between the acquisition of two consecutive sampled values hereinafter defined as "sampling period". Referring to FIG. 1a, the two instants of acquisition of the sampled values 8 are indicated with $T_A$ and $T_C$, while the sampling period is indicated with $T_S$. The period of time for executing the foreground processing is indicated with $T_F$. After having completed the entire foreground processing, the DSP is kept in a state of idle, for the period of time $T_I$, remaining before the instant Tc.

This processing activity can be run by the DSP in cooperation with a microcontroller.

It is also known that the DSP must accomplish other processing tasks. For example, it must run some non-periodic tasks that are, for example, needed for regulating the acquisition of the sampled values or for generating signals for controlling the mentioned protection devices. This kind of processing activities is generally called "background processing activity". Also this processing activity can be run in cooperation with a microcontroller. In this case, the DSP must also handle the communication with the microcontroller.

Digital multifunction relays of the state of the art are characterized by some drawbacks.

These non periodic processing tasks are generally performed by means of interrupt routines that are characterized by a high level of priority. This fact means that each time a background processing activity $T_B$ is run, an interruption of the foreground processing activity is provoked. As illustrated in FIG. 1b, the foreground activity is therefore delayed and the period of time, in which the DSP is kept in an idle state $T_I$ is reduced. This fact corresponds to an increase of the run-time computational load related to the DSP. The more the period $T_I$ is reduced, the more the run-time computational load is increased. If $T_I$ is equal to zero, the total computational load is equal to the 100%. The run-time computational load can be higher than 100%, for example, due to the fact that a large amount of background activity is executed. In this way, the foreground processing cannot be completed before the instant $T_C$ (FIG. 1c and the start of the processing of the next samples is delayed by some amount.

If the delay is too high, a sampled value can be overwritten, before being processed. This fact means that some sampled values might be lost, with consequent imprecision of the performed calculations and possible wrong operation of the protection functions i.e. wrong start of protection functions or, at worst, wrong control signals sent to the protection devices.

Some solutions of the state of the art, has tried to overcome this problem measuring the average amount of processing activity run by the DSP. This measure is generally executed "a priori ", therefore in a static mode, or using an external microcontroller.

The average amount of processing activity can give an indication whether the overload condition is a frequent event or not. In the first case, the used DSP could be changed with a more powerful one. In the second case, the overload condition can be sustained, because it is related to a limited period of time.

Unfortunately, this kind of approach is not very useful in practice. No regulation of the computational load is carried out run-time. Moreover, this approach can be expensive and not very flexible, if new functions are requested to the digital multifunction relay. Further, bearing a condition of overload could bring to the failure of the digital multifunction relay. In fact, even if the DSP comes back to normal load conditions, during the period of overload dangerous computational errors can be made. This fact can bring to undesired operations of the controlled protection devices.

Therefore, one aspect of an embodiment of the invention is directed to realizing a digital multifunction relay, which allows avoidance of run-time computational overload conditions in the digital signal processor.

Within this aim, another of the aspect of the invention is to realize a digital multifunction relay, which easily identifies conditions of run-time, computational overload in the digital signal processor.

Another aspect of the invention is to realize a digital multifunction relay, which allows execution of run-time regulation of the run-time computational load in the digital signal processor.

Another aspect of the invention is to realize a digital multifunction relay, which allows operating a temporary reduction in the run-time computational load, if a condition of overload is identified.

Another aspect of the invention is to realize a digital multifunction relay, which can be easily adapted to accept a change in requested functionality, to avoid expensive operations.

Thus, various aspects of embodiments of the invention provide a digital multifunction relay, for controlling one or more protection devices in a power distribution network, at least a digital signal processor for executing a set of processing activities for regulating an operating state of the protection devices.

At least one aspect of the claimed digital multifunction relay includes a first computerized means for calculating a run-time or real-time computational load experienced by the digital signal processor. A second computerized means for reducing the run-time computational load experienced by the digital signal processor is operative if the run-time computational load exceeds a predefined threshold.

It should be noticed that the digital multifunction relay, according to aspects of the invention, allows achieving various objectives which overcome shortcomings of conventional approaches. In fact, use of the first computerized means allows easy detection of a condition of run-time computational overload.

The calculation of the computational load is performed at run-time, i.e., in real-time, which means that, for every sampling period elapsing between two instants of acquisition of the sampled values, the computational load is computed. This allows immediate correction of the run-time computational load. This is made feasible by virtue of the presence of the second computerized means, which allows reducing, immediately, in real-time, the run-time computational load of the digital signal processor. Therefore, conditions of overload are avoided, and a run-time regulation of the run-time computational load can easily be performed.

BRIEF DESCRIPTION OF THE DRAWINGS

Further characteristics and advantages of the invention shall emerge more clearly from the description of preferred but not exclusive embodiments of the digital multifunction relay according to the present invention, illustrated purely by way of example and without limitation in the attached drawings, in which.

DETAILED DESCRIPTION

Figure 2:
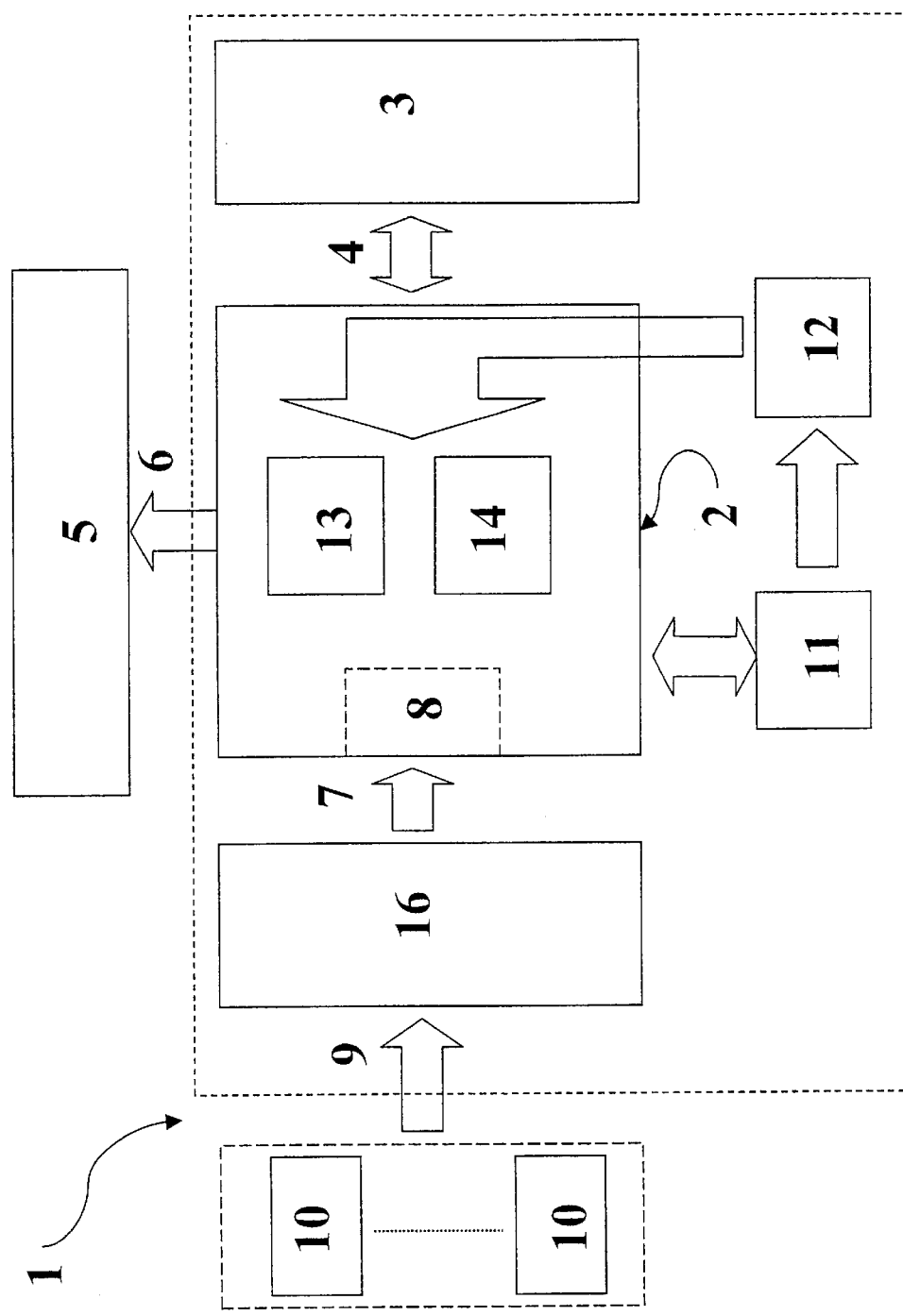
FIG. 2 is a diagram, which illustrates a digital multifunction relay, according to the present invention.

Referring now to FIG. 2, a schematic view of the digital multifunction relay, according to the present invention, is presented. The digital multifunction relay according to the present invention, 1 comprises a digital signal processor (DSP) 2 for executing a set of processing activities for regulating, by means of the generation of the control signals 6, the operating state of the protection devices 5. The protection devices 5 may comprise, for example, tripping devices or disconnectors or the like.

In particular, the DSP 2 can cooperate with a microcontroller 3 that can exchange information (reference arrow 4) for executing a set of processing activities that can comprise both the foreground and the background processing activity, described above.

The DSP 2 receives (reference arrow 7), from an analog/digital converter 16, sampled values 8, suitable to be digitally processed, and which are related to analog signals 9 indicative of physical quantities measured on the power distribution network.

The signals 9 are measured, for example, by means of one or more sensors 10, placed on the power distribution network (not illustrated).

The digital multifunction relay 1 comprises first computerized means 11 for calculating the run-time computational load related to the DSP 2.

Figure 1:
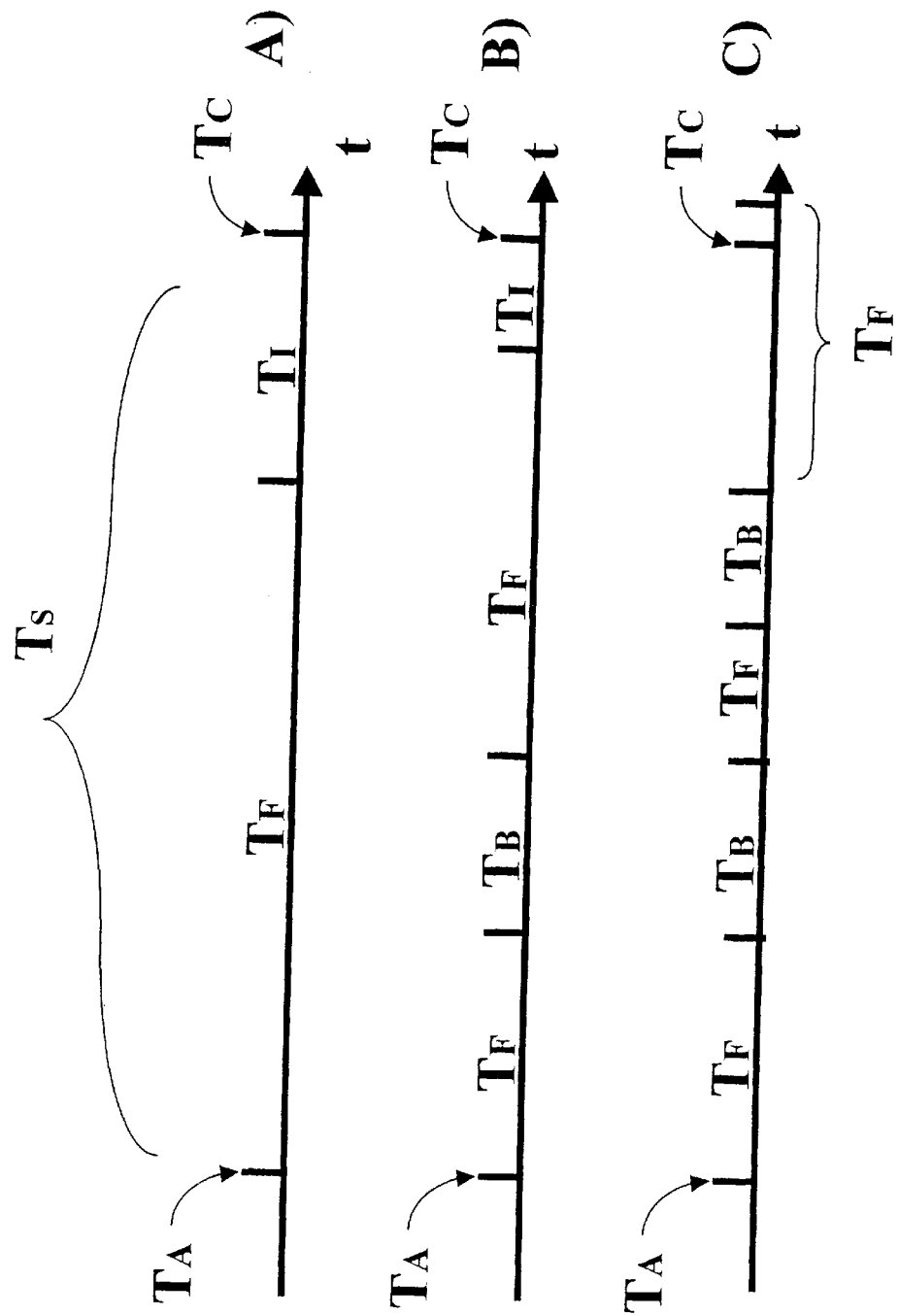
FIG. 1 is a diagram, which illustrates some possible operating conditions for a digital signal processor comprised in a conventional digital multifunction relay.

Referring back to FIG. 1, the first computerized means 11 comprise, in a preferred embodiment, a counter, which calculates the duration of the period $T_I$, in which the DSP 2 is kept in an idle state. This solution is particularly advantageous because it allows calculating easily the total amount of run-time computational load, which affects the DSP. As described above, the total amount of computational load is given by adding the amount due to the foreground processing activity and to the amount due to the background processing activity. So, the measure of the period $T_I$ is indicative of the total amount of the run-time computational load. The less is $T_I$, the more is the computational load, which affects the DSP 2. It should be noticed that the mentioned calculations, thanks to the described solution, can be easily performed for every sampling period Ts, which lasts between the instants of acquisition of a first (instant $T_A$) and a second (instant $T_C$) sampled value 8.

Referring again to FIG. 2, the digital multifunction relay 1 comprises second computerized means 12 for reducing the run-time computational load of the DSP 2, if said run-time computational load exceeds a predefined threshold.

In a preferred embodiment, which will be described better hereinafter, the second computerized means 12 can reduce the run-time computational load of the DSP 2 by means of reducing the computational load due to the foreground processing activity of the DSP 2.

This solution is particularly advantageous because it allows reducing a processing activity, which is deterministic. So, if this processing activity is reduced by a certain amount, the total run-time computational load will be reduced by the same amount. In this way, the maximum level of effectiveness is provided.

Advantageously, second computerized means 12 can comprise a logical selector (not illustrated) for selecting a first set of algorithms 13 or a second set of algorithms 14 for executing the mentioned foreground processing activity. The sets of algorithms 13 and 14 affect advantageously the DSP 2 with different run-time computational loads. In particular, the second set of algorithms 14 may affect the DSP with a lower computational load with respect of the first set of algorithm 13.

Advantageously, the mentioned logical selector selects the first predefined set of algorithms for executing the foreground processing activity, if the run-time computational load does not exceed a predefined threshold. In this case, the DSP is running in normal conditions, so that the first set of algorithms 13 can be used, even if they are "heavy" to be executed. Preferably, the algorithms 13 are constructed in such a way to ensure the maximum level of accuracy for the DSP processing. As known to those skilled in the art, they can require complicated operations for the sake of accuracy.

On the other end, if the run-time computational load exceeds the mentioned predefined threshold, the logical selector selects the second predefined set of algorithms 14. In this case the DSP is running in overload conditions, so that the computational load must be reduced immediately. This can be easily obtained forcing the DSP, by means of the logical selector, to execute "lighter" algorithms, like those comprised in set 14. Obviously, the algorithms of set 14 cannot ensure the same level of accuracy as the algorithms of set 13. This is not to be considered a problem because the algorithms of set 14 are used only for the period of time, in which an overload condition is present. For this reason, it is not difficult to use algorithms that provide, for a short period of time, a safe level of accuracy. This fact ensures that, even if the DSP does not run at the maximum level of accuracy it prevents, in any case, the hosted protection functions related to the controlled protection devices 5 from failure.

Advantageously the set 14 can comprise algorithms that are based on iterative incremental calculations. In this way, as known to those skilled in the art, many complex operations can easily be avoided.

In a further preferred embodiments, the first computerized means 11 comprise a logical analyzer block for evaluating the computational load, due to the foreground processing activity, which affects the DSP 2 in a subsequent sampling period of time. For example, referring again to FIG. 1, it can be considered a predefined period of time, which elapses between the instant of acquisition of the second sampled value 8 (Tc) and a third sampled value 8 (not illustrated). In this case, the mentioned logical selector can select, internally to set 14, different kinds of "light" algorithms, so as to regulate with more accuracy the level of reduction of the computational load. In this way, an "a priori" regulation of the run-time computational load of the DSP can be easily executed. It has been proven, in practice, that the digital multifunction relay, according to the present invention, allows achieving all the intended aim and objects.

In particular, it allows obtaining serious improvements of the performances of the hosted protection functions related to the controlled protection devices 5, in terms of flexibility and reliability, at the same levels of cost.

The digital multifunction relay, according to the present invention, thus conceived is capable of numerous modifications and variants that are all within the inventive concept.

Moreover, all the details can be substituted by technically equivalent elements.

What is claimed is:

1. A digital multifunction relay which controls one or more protection devices of a power distribution network arranged to protect the network from a fault event, the relay comprising:
   digital signal processor means for executing a set of processing activities which regulate an operating state of said one or more protection devices of the power distribution network;
   first computerized means, connected to the digital signal processor means, for calculating a run-time computational load related to said digital signal processor means; and
   second computerized means, connected to the digital signal processor means and the first computerized means, for reducing said run-time computational load related to said digital signal processor means when said run-time computational load is calculated by the first computerized means as exceeding a predefined threshold,
   wherein, when the fault event is detected by the digital signal processor means, the digital multifunction relay is operated to change the operating state of said one or more protection devices.

2. The digital multifunction relay of claim 1, wherein said digital signal processor means is operatively connected to a with a microcontroller which executes said set of processing activities which regulate the operating state of said one or more protection devices.

3. The digital multifunction relay of claim 2, wherein said digital signal processor means is operably connected to first means for converting analog signals into sampled values suitable for digital processing, said analog signals representing physical quantities measured on said power distribution network.

4. The digital multifunction relay of claim 2, wherein said digital signal processor means performs a foreground processing activity, said foreground processing activity comprising:
   acquiring and processing said sampled values and obtaining predefined calculated values suitable for controlling said protection devices; and
   generating control signals which regulate an operating state of said protection devices.

5. The digital multifunction relay of claim 2, wherein said digital signal processor means performs a background processing, said background processing comprises performing non-periodic processing tasks.

6. The digital multifunction relay of claim 1, wherein said digital signal processor means is operatively connected to first means for converting analog signals into sampled values suitable for digital processing, said analog signals being indicative of physical quantities measured on said power distribution network.

7. The digital multifunction relay of claim 6, wherein said digital signal processor means performs a foreground processing activity, said foreground processing activity comprising:
   acquiring, and processing said sampled values and obtaining predefined calculated values suitable controlling said protection devices; and
   generating control signals which regulate an operating state of said protection devices.

8. The digital multifunction relay of claim 6, wherein said digital signal processor means performs a background processing, said background processing activity comprising performing non-periodic processing tasks.

9. The digital multifunction relay of claim 1, wherein said digital signal processor means performs a foreground processing activity, said processing activity including:
   acquiring and processing said sampled values and obtaining predefined calculated values suitable for the control of said protection devices, and
   generating control signals for regulating the operating state of said protection devices.

10. The digital multifunction relay of claim 1, wherein said digital signal processor means performs a background processing,
   said background processing activity including performing non-periodic processing tasks.

11. The digital multifunction relay of claim 10, wherein said first computerized means comprises a counter, said counter calculating, during a predefined period of time, a period of time in which said digital signal processor is not affected by any computational overload.

12. The digital multifunction relay of claim 10, wherein said first computerized means comprises a logical analyzer which evaluates a computational load which affects said digital signal processor means in a predefined subsequent period of time due to said foreground processing activity, said subsequent period of time elapsing between second and third instances of acquisition of a second sampled value and a third sampled value, respectively.

13. The digital multifunction relay of claim 1, wherein said first computerized means calculates the run-time computational load of said digital signal processor means in a predefined period of time elapsing between first and second acquisition times corresponding to a first sampled value and a second sampled value, respectively.

14. The digital multifunction relay of claim 13, wherein said first computerized means calculates said run-time computational load by calculating a total run-time computational load due to both said foreground activity and said background activity.

15. The digital multifunction relay of claim 1, wherein said second computerized means reduces said run-time computational load by reducing a foreground run-time computational load due to a foreground processing activity.

16. The digital multifunction relay of claim 5, wherein said second computerized means comprises logical selector means for selecting one of a first set of algorithms and a second set of algorithms for executing said foreground processing activity, each of said first and second sets of algorithms affecting said digital signal processor means with different first and second computational loads, respectively.

17. The digital multifunction relay of claim 16, wherein said second set of algorithms is operable to lower a computational load in said digital signal processor means relative to a computational load in said digital signal processor means when said first set of algorithm are operable in said digital signal processor means.

18. The digital multifunction relay of claim 16, wherein said logical selector means is operable to select said first set of algorithms which cause execution of said foreground processing activity when said run-time computational load does not exceed a predefined threshold and said second set of algorithms which cause execution of said foreground processing activity if said run-time computational load exceeds said predefined threshold.

19. The digital multifunction relay of claim 16, wherein said logical selector means is operable to select, in said second set of algorithms, one of a plurality of different second algorithms depending on an evaluation of the computational load due to said foreground processing activity in said digital signal processor means during a predefined subsequent period of time elapsing between second and third instances of acquisition of a second sampled value and a third sampled value, respectively.

20. The digital multifunction relay of claim 16, wherein said second set of algorithms comprise algorithms based upon plural iterative incremental calculations.

21. A power distribution network, comprising:
   at least one digital multifunction relay of claim 1, and
   one or more protection devices arranged to protect the power distribution network from fault events.

22. A method of controlling one or more protection devices of a power distribution network from a network fault event using a digital multifunction relay which includes a digital signal processor, the method comprising:
   executing a set of processing activities which regulate an operating state of said one or more protection devices;
   calculating a run-time computational load related to said digital signal processor;
   reducing the run-time computational load related to said digital signal processor when said run-time computational load indicates an overload condition in the digital signal processor; and
   determining a presence of the network fault event and operating the digital multifunction relay to control the one or more protection devices of the power distribution network when the presence of the network fault event is determined.

23. The method of claim 22, further comprising:
   reducing said in-time computational load by reducing a foreground run-time computational load due to a foreground processing activity.

24. The method of claim 23, further comprising selecting one of a first set of algorithms and a second set of algorithms which execute said foreground processing activity, each of said first and second sets of algorithms resulting in different first and second computational loads, respectively, in the digital signal processor.

25. The method of claim 24, wherein, when said second set of algorithms is selected, the run-time computational load in said digital signal processor is reduced relative to a computational load in said digital signal processor when said first set of algorithm are selected.

26. The method of claim 24, wherein said selecting one of the first set of algorithms and the second set of algorithms comprises selecting the first set of algorithms when said run-time computational load does not exceed a overload threshold value, and selecting said second set of algorithms when said run-time computational load exceeds said overload threshold value.

27. The method of claim 24, further comprising, when said selecting one of the first set of algorithms and the second set of algorithms results in selection of the second set of algorithms:
   selecting one of a plurality of different second algorithms depending on an evaluation of the computational load due to said foreground processing activity in said digital signal processor during a period or time elapsing between first and second acquisition times corresponding to first and second sampled values, respectively.

28. The method of claim 24, further comprising, when said selecting one of the first set of algorithms and the second set of algorithms results in selection of the second set of algorithms, selecting a second set of algorithms including algorithms based upon plural iterative incremental calculations to relieve an overload condition in the digital signal processor.

* * * * *